(12) United States Patent
Rossmann

(10) Patent No.: US 7,577,838 B1
(45) Date of Patent: Aug. 18, 2009

(54) HYBRID SYSTEMS FOR SECURING DIGITAL ASSETS

(76) Inventor: Alain Rossmann, 1247 Cowper St., Palo Alto, CA (US) 94301

( * ) Notice: Subject to any disclaimer, the term of this patent is extended or adjusted under 35 U.S.C. 154(b) by 716 days.

(21) Appl. No.: 10/325,013

(22) Filed: Dec. 20, 2002

(51) Int. Cl.
H04L 9/00 (2006.01)
H04L 9/32 (2006.01)

(52) U.S. Cl. .................. 713/165; 713/189; 713/193; 726/1; 726/27; 726/28

(58) Field of Classification Search .............. 726/1–2, 726/26–30; 713/165–167, 189, 193
See application file for complete search history.

(56) References Cited

U.S. PATENT DOCUMENTS

| | | | |
|---|---|---|---|
| 4,203,166 A | 5/1980 | Eshram et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |

(Continued)

FOREIGN PATENT DOCUMENTS

EP 0 672 991 A2 9/1995

(Continued)

OTHER PUBLICATIONS

Expiration Mechanism for Chipcards, IBM Technical Disclosure Bulletin, Oct. 1, 2001, UK.

(Continued)

*Primary Examiner*—Hosuk Song
(74) *Attorney, Agent, or Firm*—Sterne, Kessler, Goldstein & Fox PLLC.

(57) ABSTRACT

Digital assets (e.g., files) are protected with a combination of more than one type of applicable security means. Techniques are developed to determine which of the security means to enforce in accordance with an access policy or policies when an access request is received. According to one embodiment, an interpreter or an access control module intercepts an access request from a requestor to access a secured file. The access control module is configured to determine if the access request is to be granted or denied to enforce security of the file through an access control technique and a cryptographic technique; and when the access request is granted, a key is retrieved to proceed with the access request.

29 Claims, 4 Drawing Sheets

U.S. PATENT DOCUMENTS

| | | |
|---|---|---|
| 5,414,852 A | 5/1995 | Kramer et al. |
| 5,495,533 A | 2/1996 | Linehan et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,655,119 A | 8/1997 | Davy |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,684,987 A | 11/1997 | Mamiya et al. |
| 5,689,718 A | 11/1997 | Sakurai et al. |
| 5,699,428 A | 12/1997 | McDonnal et al. |
| 5,708,709 A | 1/1998 | Rose |
| 5,715,403 A | 2/1998 | Stefik |
| 5,717,755 A | 2/1998 | Shanton |
| 5,719,941 A | 2/1998 | Swift et al. |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,778,065 A | 7/1998 | Hauser et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,813,009 A | 9/1998 | Johnson et al. |
| 5,821,933 A | 10/1998 | Keller et al. |
| 5,825,876 A | 10/1998 | Peterson |
| 5,835,592 A | 11/1998 | Chang et al. |
| 5,835,601 A | 11/1998 | Shimbo et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A | 8/1999 | Schnek et al. |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,987,440 A | 11/1999 | O'Neil et al. |
| 5,991,879 A | 11/1999 | Still |
| 5,999,907 A | 12/1999 | Donner |
| 6,014,730 A | 1/2000 | Ohtsu |
| 6,023,506 A | 2/2000 | Ote et al. |
| 6,032,216 A | 2/2000 | Schmuck et al. |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,069,957 A | 5/2000 | Richards |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 9/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,158,010 A | 12/2000 | Moriconi et al. |
| 6,161,139 A | 12/2000 | Win et al. |
| 6,182,142 B1 | 1/2001 | Win et al. |
| 6,185,684 B1 | 2/2001 | Pravetz et al. |
| 6,192,408 B1 | 2/2001 | Vahalia et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold et al. |
| 6,240,188 B1 | 5/2001 | Dondeti et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,272,631 B1 * | 8/2001 | Thomlinson et al. ........ 713/155 |
| 6,272,632 B1 | 8/2001 | Carmen et al. |
| 6,282,649 B1 | 8/2001 | Lambert et al. |
| 6,289,450 B1 | 9/2001 | Pensak et al. |
| 6,292,895 B1 | 9/2001 | Baltzley |
| 6,292,899 B1 | 9/2001 | McBride |
| 6,295,361 B1 | 9/2001 | Kadansky et al. |
| 6,301,614 B1 | 10/2001 | Najork et al. |
| 6,308,256 B1 | 10/2001 | Folmsbee |
| 6,308,273 B1 * | 10/2001 | Goertzel et al. ................ 726/9 |
| 6,314,409 B2 | 11/2001 | Schnek et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,370,249 B1 | 4/2002 | Van Oorschot |
| 6,381,698 B1 | 4/2002 | Devanbu et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 | 11/2002 | Bolosky et al. |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |

| Patent Number | Kind | Date | Inventor(s) |
|---|---|---|---|
| 6,542,608 | B2 | 4/2003 | Scheidt et al. |
| 6,549,623 | B1 | 4/2003 | Scheidt et al. |
| 6,550,011 | B1 | 4/2003 | Sims |
| 6,557,039 | B1 | 4/2003 | Leong et al. |
| 6,567,914 | B1 | 5/2003 | Just et al. |
| 6,571,291 | B1 | 5/2003 | Chow |
| 6,584,466 | B1 | 6/2003 | Serbinis et al. |
| 6,587,946 | B1 | 7/2003 | Jakobsson |
| 6,588,673 | B1 | 7/2003 | Chan et al. |
| 6,594,662 | B1 | 7/2003 | Sieffert et al. |
| 6,598,161 | B1 | 7/2003 | Kluttz et al. |
| 6,603,857 | B1 | 8/2003 | Batten-Carew et al. |
| 6,608,636 | B1 | 8/2003 | Roseman |
| 6,611,599 | B2 | 8/2003 | Natarajan |
| 6,611,846 | B1 | 8/2003 | Stoodley |
| 6,615,349 | B1 | 9/2003 | Hair |
| 6,615,350 | B1 | 9/2003 | Schell et al. |
| 6,625,650 | B2 | 9/2003 | Stelliga |
| 6,629,243 | B1 | 9/2003 | Kleinman et al. |
| 6,633,311 | B1 | 10/2003 | Douvikas et al. |
| 6,640,307 | B2 | 10/2003 | Viets et al. |
| 6,646,515 | B2 | 11/2003 | Jun et al. |
| 6,647,388 | B2 | 11/2003 | Numao et al. |
| 6,678,835 | B1 | 1/2004 | Shah et al. |
| 6,687,822 | B1 | 2/2004 | Jakobsson |
| 6,711,683 | B1 | 3/2004 | Laczko et al. |
| 6,718,361 | B1 | 4/2004 | Basani et al. |
| 6,735,701 | B1 | 5/2004 | Jacobson |
| 6,738,908 | B1 | 5/2004 | Bonn et al. |
| 6,775,779 | B1 | 8/2004 | England et al. |
| 6,782,403 | B1 | 8/2004 | Kino et al. |
| 6,801,999 | B1 | 10/2004 | Venkatesan et al. |
| 6,807,534 | B1 | 10/2004 | Erickson |
| 6,807,636 | B2 | 10/2004 | Hartman et al. |
| 6,810,389 | B1 | 10/2004 | Meyer |
| 6,810,479 | B1 | 10/2004 | Barlow et al. |
| 6,816,871 | B2 | 11/2004 | Lee |
| 6,826,698 | B1 | 11/2004 | Minkin et al. |
| 6,834,333 | B2 | 12/2004 | Yoshino et al. |
| 6,834,341 | B1 | 12/2004 | Bahl et al. |
| 6,845,452 | B1 | 1/2005 | Roddy et al. |
| 6,851,050 | B2 | 2/2005 | Singhal et al. |
| 6,865,555 | B2 | 3/2005 | Novak |
| 6,874,139 | B2 | 3/2005 | Krueger et al. |
| 6,877,136 | B2 | 4/2005 | Bess et al. |
| 6,889,210 | B1 | 5/2005 | Vainstein |
| 6,891,953 | B1 | 5/2005 | DeMello et al. |
| 6,892,201 | B2 | 5/2005 | Brown et al. |
| 6,892,306 | B1 | 5/2005 | En-Seung et al. |
| 6,907,034 | B1 | 6/2005 | Begis |
| 6,909,708 | B1 | 6/2005 | Krishnaswamy et al. |
| 6,915,434 | B1 | 7/2005 | Kuroda et al. |
| 6,920,558 | B2 | 7/2005 | Sames et al. |
| 6,931,450 | B2 | 8/2005 | Howard et al. |
| 6,931,530 | B2 | 8/2005 | Pham et al. |
| 6,931,597 | B1 | 8/2005 | Prakash |
| 6,938,042 | B2 | 8/2005 | Aboulhosn et al. |
| 6,941,355 | B1 | 9/2005 | Donaghey et al. |
| 6,941,456 | B2 | 9/2005 | Wilson |
| 6,941,472 | B2 | 9/2005 | Moriconi et al. |
| 6,944,183 | B1 | 9/2005 | Iyer et al. |
| 6,947,556 | B1 | 9/2005 | Matyas, Jr. et al. |
| 6,950,818 | B2 | 9/2005 | Dennis et al. |
| 6,950,936 | B2 | 9/2005 | Subramaniam et al. |
| 6,950,941 | B1 | 9/2005 | Lee et al. |
| 6,950,943 | B1 * | 9/2005 | Bacha et al. .................. 726/21 |
| 6,952,780 | B2 | 10/2005 | Olsen et al. |
| 6,957,261 | B2 | 10/2005 | Lortz |
| 6,959,308 | B2 | 10/2005 | Gramsamer et al. |
| 6,961,849 | B1 | 11/2005 | Davis et al. |
| 6,968,060 | B1 | 11/2005 | Pinkas |
| 6,971,018 | B1 | 11/2005 | Witt et al. |
| 6,978,376 | B2 | 12/2005 | Giroux et al. |
| 6,978,377 | B1 | 12/2005 | Asano et al. |
| 6,988,133 | B1 | 1/2006 | Zavalkovsky et al. |
| 6,988,199 | B2 | 1/2006 | Toh et al. |
| 6,993,135 | B2 | 1/2006 | Ishibashi |
| 6,996,718 | B1 | 2/2006 | Henry et al. |
| 7,003,117 | B2 | 2/2006 | Kacker et al. |
| 7,003,560 | B1 * | 2/2006 | Mullen et al. ................ 709/223 |
| 7,003,661 | B2 | 2/2006 | Beattie et al. |
| 7,013,332 | B2 | 3/2006 | Friedel et al. |
| 7,013,485 | B2 * | 3/2006 | Brown et al. .................. 726/27 |
| 7,020,645 | B2 | 3/2006 | Bisbee et al. |
| 7,024,427 | B2 | 4/2006 | Bobbitt et al. |
| 7,035,854 | B2 | 4/2006 | Hsiao et al. |
| 7,035,910 | B1 | 4/2006 | Dutta et al. |
| 7,046,807 | B2 | 5/2006 | Hirano et al. |
| 7,051,213 | B1 | 5/2006 | Kobayashi et al. |
| 7,058,696 | B1 | 6/2006 | Phillips et al. |
| 7,058,978 | B2 | 6/2006 | Feuerstein et al. |
| 7,073,063 | B2 | 7/2006 | Peinado |
| 7,073,073 | B1 | 7/2006 | Nonaka et al. |
| 7,076,067 | B2 | 7/2006 | Raike et al. |
| 7,076,312 | B2 | 7/2006 | Law et al. |
| 7,076,469 | B2 | 7/2006 | Schreiber et al. |
| 7,076,633 | B2 | 7/2006 | Tormasov et al. |
| 7,080,077 | B2 | 7/2006 | Ramamurthy et al. |
| 7,095,853 | B2 | 8/2006 | Morishita |
| 7,096,266 | B2 | 8/2006 | Lewin et al. |
| 7,099,926 | B1 | 8/2006 | Ims et al. |
| 7,107,269 | B2 | 9/2006 | Arlein et al. |
| 7,107,416 | B2 | 9/2006 | Stuart et al. |
| 7,117,322 | B2 | 10/2006 | Hochberg et al. |
| 7,120,635 | B2 | 10/2006 | Bhide et al. |
| 7,120,757 | B2 | 10/2006 | Tsuge |
| 7,124,164 | B1 | 10/2006 | Chemtob |
| 7,130,964 | B2 | 10/2006 | Ims et al. |
| 7,131,071 | B2 | 10/2006 | Gune et al. |
| 7,134,041 | B2 | 11/2006 | Murray et al. |
| 7,136,903 | B1 | 11/2006 | Phillips et al. |
| 7,145,898 | B1 | 12/2006 | Elliott |
| 7,146,388 | B2 | 12/2006 | Stakutis et al. |
| 7,146,498 | B1 | 12/2006 | Takechi et al. |
| 7,159,036 | B2 | 1/2007 | Hinchliffe et al. |
| 7,171,557 | B2 | 1/2007 | Kallahalla et al. |
| 7,174,563 | B1 | 2/2007 | Brownlie et al. |
| 7,177,427 | B1 | 2/2007 | Komuro et al. |
| 7,178,033 | B1 | 2/2007 | Garcia |
| 7,181,017 | B1 | 2/2007 | Nagel et al. |
| 7,185,364 | B2 | 2/2007 | Knouse et al. |
| 7,187,033 | B2 | 3/2007 | Pendharkar |
| 7,188,181 | B1 | 3/2007 | Squier et al. |
| 7,194,764 | B2 | 3/2007 | Martherus et al. |
| 7,200,747 | B2 | 4/2007 | Riedel et al. |
| 7,203,317 | B2 | 4/2007 | Kallahalla et al. |
| 7,203,968 | B2 | 4/2007 | Asano et al. |
| 7,219,230 | B2 | 5/2007 | Riedel et al. |
| 7,224,795 | B2 | 5/2007 | Takada et al. |
| 7,225,256 | B2 | 5/2007 | Villavicencio |
| 7,227,953 | B2 | 6/2007 | Shida |
| 7,233,948 | B1 | 6/2007 | Shamoon et al. |
| 7,237,002 | B1 | 6/2007 | Estrada et al. |
| 7,249,044 | B2 | 7/2007 | Kumar et al. |
| 7,260,555 | B2 | 8/2007 | Rossmann et al. |
| 7,265,764 | B2 | 9/2007 | Alben et al. |
| 7,266,684 | B2 | 9/2007 | Jancula |
| 7,280,658 | B2 | 10/2007 | Amini et al. |
| 7,287,055 | B2 | 10/2007 | Smith et al. |
| 7,290,148 | B2 | 10/2007 | Tozawa et al. |
| 7,308,702 | B1 | 12/2007 | Thomsen et al. |
| 7,313,824 | B1 | 12/2007 | Bala et al. |
| 7,319,752 | B2 | 1/2008 | Asano et al. |
| 7,340,600 | B1 | 3/2008 | Corella |
| 7,380,120 | B1 | 5/2008 | Garcia |
| 7,383,586 | B2 | 6/2008 | Cross et al. |

| | | |
|---|---|---|
| 7,386,529 B2 | 6/2008 | Kiessig et al. |
| 2001/0011254 A1 | 8/2001 | Clark |
| 2001/0021926 A1 | 9/2001 | Schnek et al. |
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 | 3/2003 | Murray et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 | 5/2003 | DiPierro |
| 2003/0101072 A1 | 5/2003 | Dick et al. |
| 2003/0110169 A1 | 6/2003 | Zuili |
| 2003/0110266 A1 | 6/2003 | Rollins et al. |
| 2003/0110397 A1 | 6/2003 | Supramaniam et al. |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0154381 A1 | 8/2003 | Ouye |
| 2003/0159066 A1* | 8/2003 | Staw et al. ............... 713/201 |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0075465 A1 | 4/2006 | Ramanathan et al. |
| 2006/0093150 A1 | 5/2006 | Reddy et al. |
| 2006/0168147 A1 | 7/2006 | Inoue et al. |
| 2006/0230437 A1 | 10/2006 | Boyer et al. |
| 2007/0006214 A1 | 1/2007 | Dubal et al. |
| 2007/0067837 A1 | 3/2007 | Schuster |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107 504 A2 | 6/2001 |
| EP | 1 130 492 A2 | 9/2001 |
| EP | 1 154 348 A2 | 11/2001 |
| EP | 1324565 A1 | 7/2003 |

| | | | |
|---|---|---|---|
| GB | 2 328 047 A | 2/1999 | |
| JP | 2001-036517 | 2/2001 | |
| WO | WO 96/41288 A1 | 12/1996 | |
| WO | WO 00/56028 A2 | 9/2000 | |
| WO | WO 01/61438 A2 | 8/2001 | |
| WO | WO 01/63387 A2 | 8/2001 | |
| WO | WO 01/63387 A3 | 8/2001 | |
| WO | WO 01/77783 A2 | 10/2001 | |
| WO | WO 01/78285 A1 | 10/2001 | |
| WO | WO 01/84271 A2 | 11/2001 | |

OTHER PUBLICATIONS

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

"Inside Encrypting file system," Part 1, from MSDN Oct. 2001 version, exact publication date is unknown but believed prior to Dec. 12, 2001.

"Inside Encrypting file system," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS work," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS" from MSDN Oct. 2001 version, exact publication date is unknown but believed prior to Dec. 12, 2001.

"Windows 2000 EFS" in the Apr. 1999 issue of Windows NT magazine.

Microsoft Windows 200 server. Windows 2000 Group Policy White Paper, 2000.

Symantec. Norton Antivirus Corporate Edition Implementation Guide, 1999.

Crocker, Steven Toye, "Multi-level cryptographic transformations for securing digital assets," U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment," U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/028,397, entitled "Method and system for restricting use of a clipboard application," inventor Zuili, Dec. 21, 2001, 38 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities" inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files" inventor Ryan, Jun. 30, 2003, 33 pgs.

U.S. Appl. No. 10/448,806, entitled "Method and System for Using Remote Headers to Secure Electronic Files" inventor Ryan, May 30, 2003, 35 pgs.

U.S. Appl. No. 10/074,194, entitled "Methods for identifying compounds that inhibit or reduce PTP1B expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/186,203, entitled "Method and System for Implementing Changes to Security Policies in a Distributed Security System," inventor Huang, Jun. 26, 2002, 65 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Boneh et al., "Hierarchical Identity Based Encryption with Constant Size Ciphertext," Advances in Cryptology- Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

HYBRID SYSTEMS FOR SECURING DIGITAL ASSETS

CROSS-REFERENCE TO RELATED APPLICATION

This application is related to U.S. patent application Ser. No. 10/074,804, filed Feb. 12, 2002, and entitled "Secured Data Format for Access Control," now issued as U.S. Pat. No. 7,380,120, and U.S. patent application Ser. No. 10/127,109 and entitled "Evaluation of Access Rights to Secured Digital Assets", both of which are hereby incorporated by reference.

BACKGROUND OF THE INVENTION

1. Field of the Invention

The present invention relates to the area of protecting electronic data in an enterprise environment, and more particularly, relates to method and apparatus for providing flexible mechanisms for securing data assets and accessing secured data assets.

2. Description of Related Art

Attacks on e-businesses by hackers might grab newspaper headlines, but the costliest crimes, and the most difficult ones to prevent, are likely to be committed by internal hackers with inside knowledge. Examples of the internal hackers may include departing employees and consultants who have extensive knowledge about an enterprise and can break into its internal networks, accessing files and folders containing information confidential to the enterprise.

Many businesses and organizations have been looking for effective ways to protect their proprietary information. Typically, businesses and organizations have deployed firewalls, Virtual Private Networks (VPNs), and Intrusion Detection Systems (IDS) to provide protection. These systems are essential sophisticated filters aimed at securing defined perimeters by preventing unauthorized access to computing resources and data within the perimeter while allowing controlled access to the resources and data within the perimeter. Unfortunately, these various security means have been proven insufficient to reliably protect proprietary information residing on its internal networks. Numerous examples have shown that some of the defenses can be easily breached by determined outsiders, resulting in the security breach of valuable enterprise data. Further, internal hackers are the insiders that are already behind the perimeter defenses, thus giving them direct access to some sensitive data assets.

Another limitation of the perimeter based solutions is that the data assets may be protected while they are inside the secured perimeter, meaning that if for any reason and by any means the data asset is moved to a location outside the perimeter, the data asset is no longer protected. With the widespread use of Email, mobile computers, and wireless communications, it is becoming easier to move data assets beyond the secured perimeter, which can result in very serious security breaches whether the move outside the perimeter is malicious or inadvertent as it often happens with misdirected Emails. Still another limitation of the perimeter based solutions is that if a data asset must be moved from one secured perimeter to another, the sender must rely on the integrity of the destination perimeter. Sometimes the destination is a different company or a remote office in a different country and there can be no guarantee that the perimeter measures at these locations are sufficient to ensure an adequate level of security.

Currently, there have been two distinct methods for protecting data assets: access control techniques and cryptographic techniques. Each of the methods has been found to have its unique features and advantages as well as limitations.

The access control techniques depend upon one or more software modules that control access to a given data asset based on a set of conditions. For example, an access control technique is often implemented as part of an operating system (e.g., Microsoft Windows) and known under the acronym ACL for Access Control List. ACL is used to control access to files in a certain file system directory or folder with conditions determining the access being granted or denied. One of the advantages of the access control techniques for protecting data assets is its flexibility. Complex access conditions may be expressed in a way the software module(s) can interpret, which makes it possible to implement sophisticated access policies without great complexity. A file or set of files could, for example, be restricted for access by employees of a certain division during work days or only during certain hours of the days.

One of the limitations of the access control techniques, however, is that only a moderate level of security is provided. This arises from the fact that the techniques are based on software modules to interpret a set of conditions and intercepts the user's access attempt, thus a sophisticated user may bypass, replace, or modify the software modules so as to gain unauthorized access. For example, ACL for example may be circumvented by editing the data that encodes the access conditions with a disk editor or by moving the disk that contains the protected information to another file system that does not recognize or implement the access conditions.

The cryptographic techniques depend upon one or more cipher schemes to protect the proprietary information. With an encryption process, one party can protect the contents of the data from access by an unauthorized third party, yet the intended party can read the data using a corresponding decryption process. The whole point of cryptography is to keep the contents of the data or plaintext secret from eavesdroppers.

FIG. 1 shows that a plaintext 100 undergoes an encryption process 102 that produces an encrypted or ciphertext 104. The ciphertext 104 is illegible and means nothing more than a sequence of digits. To reveal the original plaintext 100, the ciphertext 104 must undergo a decryption process 106. Both encryption and decryption processes 102 and 106 are respectively proceeded with an encryption key 110 or a decryption key 112. Depending on implementation, the keys 110 and 112 may be identical or different. In any case, an intended party must posses a valid key to proceed with an encrypted file (e.g., the ciphertext 104) to recover the plaintext 108.

One of the advantages of the cryptographic techniques is that it is generally difficult to break into the ciphertext. Unless one has a valid key to access the data, the data could not be retrieved (decrypted) without a significant investment in time and resources to crack the encryption. It is currently believed that the investment required to crack an encrypted data asset may be made arbitrarily high by simply increasing the length of the key. Another one of the advantages of the cryptographic techniques is that the protection is intrinsic to the data asset and that the protection persists even if the asset is moved to a different system, even if the OS or the file access mechanism are modified. Changes to a software module used to access the data asset could not affect the protection because the protection is the result of the asset itself being encrypted not the result of a software module allowing or disallowing the access.

One of the limitations of cryptography is that it is inflexible. It does not provide means of expressing access conditions. It is the mere possession of a valid key that determines access to secured data. In certain respect, the conditions that can be expressed boil down to a binary condition: valid key or invalid key. This makes it difficult sometimes to provide access control to certain confidential information with cryptography because more sophisticated access control conditions are often required in a business environment.

For example, a group of authorized users need to access a secured file, thus a key must be issued to each of the users. Inevitably, the management of the keys becomes an issue to deal with, such as secure generation, distribution, and storage of the keys. Once a key is randomly generated, it must remain secret to avoid unfortunate mishaps (such as impersonation). In practice, most attacks on public-key systems are probably aimed at the key management level, rather than at the cryptographic algorithm itself.

Therefore, there is a need to provide flexible ways to secure data assets at all times.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention. The present invention pertains to a process, a system, a method and a software product for securing electronic data and accessing the secured electronic data. Digital assets (e.g., files) may be protected with more than one type of applicable security means. Techniques are developed to determine which of the security means to enforce when an access request is received.

One of the features in the present invention is to alleviate the limitations in the perimeter—base solutions by securing the data asset itself rather than creating secured perimeters. As a result, unauthorized insiders have no easy way to access data that has been protected no matter what perimeter access there is. Furthermore the security of the data intrinsic to the data itself and travels with the data. As a result, the data is secured even if it is moved to a location that lacks the proper level of perimeter security.

According to one aspect of the present invention, a security system, also referred to as a hybrid system, utilizes a combination of an access control technique and a cryptographic technique to provide both the high level of security afforded by cryptography and the high level of flexibility afforded by the access control. One aspect of this invention is that both techniques are combined under a single security management system allowing users to define elements of their security policies without regard to how each element will be enforced, through cryptography or through access control. According to one embodiment, once a user has defined the conditions that must be met for a given data asset to be accessed, the system automatically enforces such conditions by using a combination of cryptographic and access control techniques.

According to another aspect of the present invention, the hybrid system is designed to enforce elements of a given security policy related to the identity of the user or the identity of a group of users through the use of cryptographic keys. These users or group of users will be issued valid access keys and will therefore be able to access the protected data asset with a high level of security.

According to still another aspect of the present invention, the hybrid system is designed to enforce complex conditions other than user or group identity through the use of a software module that interprets the conditions and decided whether to grant or deny access to the protected data asset.

The invention is preferably implemented by software, but can also be implemented in hardware or a combination of hardware and software. Depending on implementation and application, the present invention may be implemented or employed in a client machine, a server machine or in a distributed manner. Typically, if a user's access privilege (i.e., access rights) to a secured file is locally determined in a client machine, the present invention may be implemented as an executable module configured to operate locally, preferably, in an operating system running in the client machine. As a result, the execution of the module is transparent as far as a human user is concerned. If a user's access right to a secured file is remotely determined in a server machine, the present invention may be implemented as an executable module configured to operate in the server machine as well as in the client machine.

There are numerous advantages, features and benefits in various embodiments of the present invention. According to one embodiment, the present invention is a method for accessing a file in a store, the method comprises intercepting an access request from a requestor to access the file; determining if the access request is to be granted or denied by an access control module configured to enforce security of the file through an access control technique and a cryptographic technique; and when the access request is granted, retrieving a key to proceed with the access request and returning the file in clear mode.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
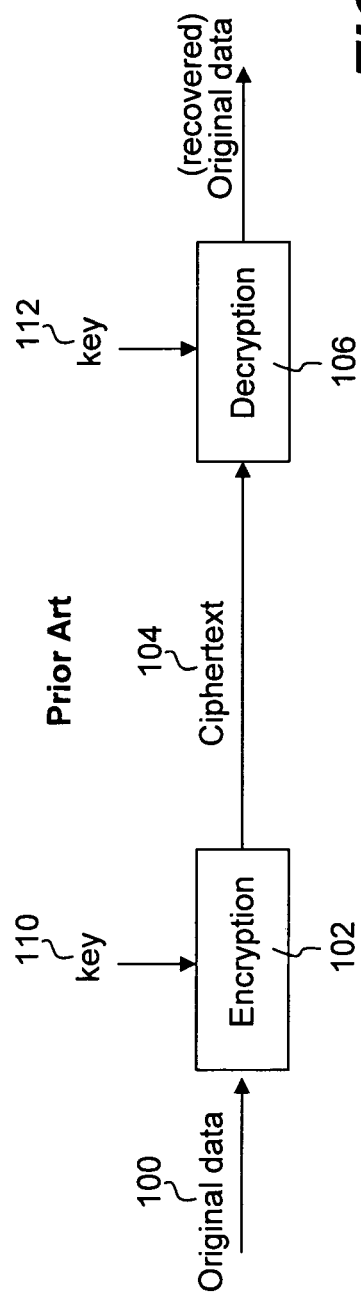
FIG. 1 shows that a plaintext undergoes an encryption process that produces an encrypted or ciphertext.

The present invention pertains to a process, a system, a method and a software product for providing restrictive access to secured electronic data (e.g., documents). According to one aspect of the present invention, a security system, also referred to as a hybrid system, utilizes a combination of an access control technique and a cryptographic technique to provide both the high level of security afforded by cryptography and the high level of flexibility afforded by the access control. Both techniques are combined under a single security management system allowing users to define elements of their security policies without regard to how each element will be enforced, through cryptography or through access control. According to one embodiment, once a user has defined the conditions that must be met for a given data asset to be accessed, the system automatically enforces such conditions by using a combination of cryptographic and access control techniques. The hybrid system is configured to enforce elements of a given security policy related to the identity of the user or the identity of a group of users through the use of cryptographic keys. These users or group of users will be issued valid access keys and will therefore be able to access the protected data asset with a high level of security. One of the features, advantages and benefits of the hybrid system is the flexible mechanism provided to enforce complex conditions other than user or group identity through the use of a software module that interprets the conditions and decided whether to grant or deny access to the protected data asset In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-4, in which like numerals refer to like parts throughout the several views. However, those skilled in the art will readily appreciate that the detailed description given herein with respect to these figures is for explanatory purposes as the invention extends beyond these limited embodiments.

Generally, a content created by a creator for the purpose of an entity is an intellectual property belonging to the creator or an entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

One of the common approaches to prevent contents in electronic data from unauthorized access is to use cryptography. Files containing sensitive or confidential information are encrypted. In a collaborative or enterprise environment, when there are multiple users who need to access the encrypted files, the issue of key management among the users does arise. The key management could be complicated when one or more users who are short-term workers need to access some of the encrypted files for a predefined duration.

Figure 2:
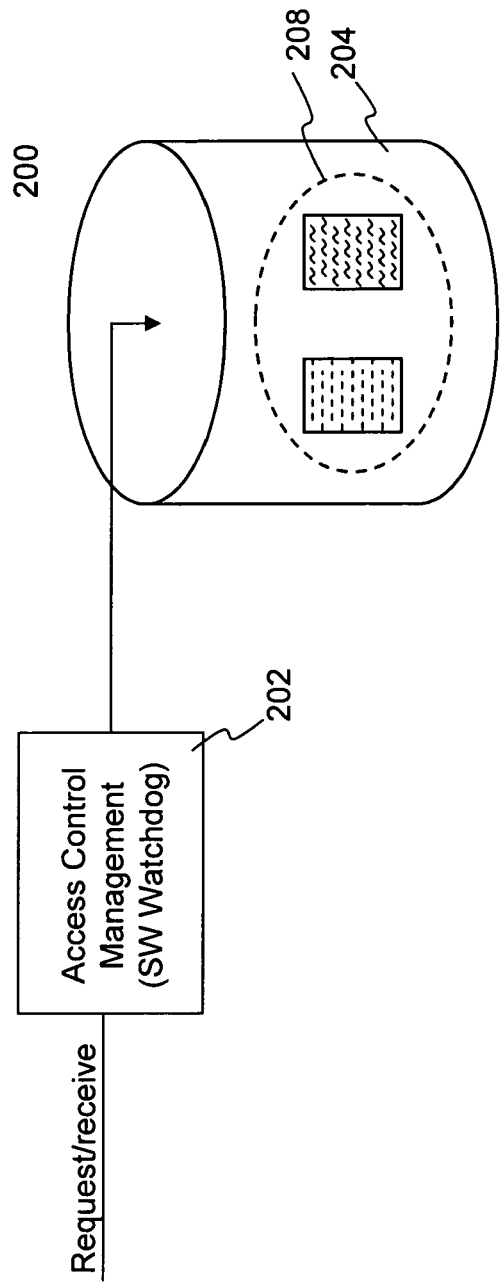
FIG. 2 shows a simplified configuration in which an access control (AC) management is implemented as a software module that is installed in a computing device (not shown) and executed therein to protect files in a designated.

According to one aspect of the present invention, an access control management is in place to control restrictive access to secured files in a designated place that may be a folder, a directory, a local or remote store. All files in the designated place, when access, are subject to the approval of the access control management 202. FIG. 2 shows a simplified configuration 200 in which the access control (AC) management 202 is implemented as a software module that is installed in a computing device (not shown) and executed therein to protect files 208 in a store 204. The computing device can be a server or a client machine. In either case, the AC management or the software module 202 acts as a watchdog to prevent form unauthorized access to the files stored in the store 204.

In operation, when a user requests to access one of the files in the store 204, a request is intercepted by the module 202 to determine if the user is authorized. If the user is not authorized, the request to access the file in the store 204 will be denied. If the user is indeed authorized, the access privilege of the user will be measured against any access rules or policies imposed upon the file. If the measurement fails, namely the user is not authorized to access the file, the request to access the file in the store 204 will be denied. On the other hand, when the measurement is successful, namely the access privilege of the user suffices, the request to access the file in the store 204 will be granted.

To facilitate the understanding of the present invention, a detailed example is provided. A secured filed, xyz.doc, is located in a folder called "finance" and imposed upon with an access policy that literally dictates "xyz.doc can only be access by members of an executive team on the conditions: between 9:00 AM-6:00 PM of weekdays, after Aug. 3, 2002." When a user attempts to access the file, the software 202 is configured to intercept the request and determine if the user can access the finance folder guarded by an access control list. The access control list may not include an access privilege for the user depending on configuration therefor. In one configuration, the access control list permits other users in addition to the executive team to access the folder. In other words, if the user is not a member of the executive team, the software 202 is configured to further determine if the access policy imposed upon the file can be satisfied with respect to various parameters pertaining to the user. If the time of the access request is beyond the time range of "9:00 AM 6:00 PM of weekdays" or before "Aug. 3, 2002", the access request is still denied. When the time of the access request falls in the time range of "9:00 AM-6:00 PM of weekdays" or after "Aug. 3, 2002", the access request is granted.

When an access request is granted, one or more keys or passwords are provided to proceed with the access to the secured file. Depending on implementation, the key(s) or password(s) may be provided by the user or automatically retrieved from a storage place. In one embodiment, a key is encrypted and stored in a temper-proof storage. Upon the granting of the access request, the key is decrypted and used to proceed with the access to the secured file.

In reference to an access control technique or a cryptographic technique used alone, the present invention provides flexible mechanisms for securing data assets and accessing secured data assets, with both the high level of security afforded by cryptography and the high level of flexibility afforded by the access control.

Figure 3A:
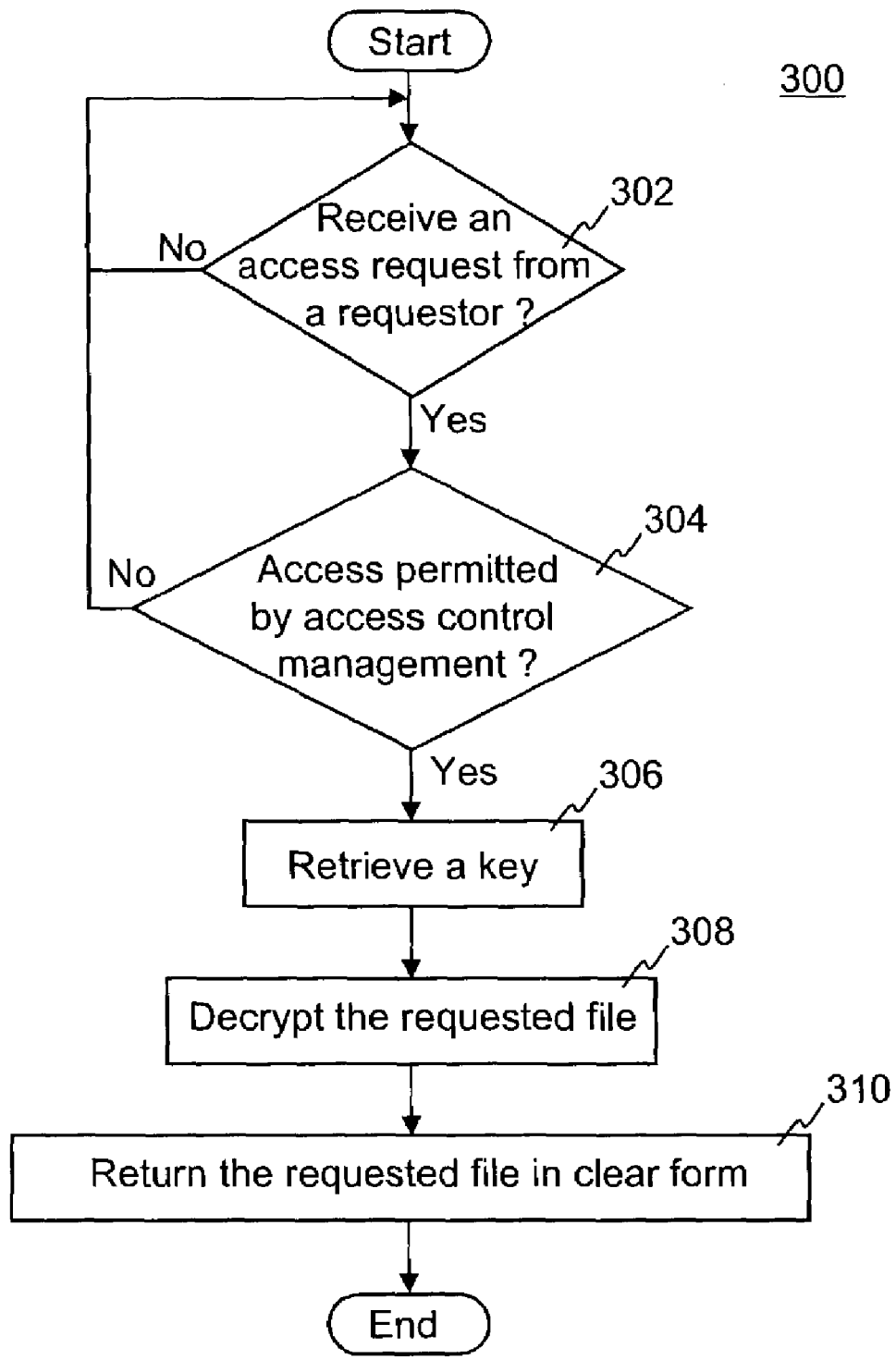
FIG. 3A shows a process flowchart in accordance with an embodiment with reference to the configuration of FIG. 2.

FIG. 3A shows a process flowchart 300 in accordance with an embodiment with reference to the configuration 200 of FIG. 2. The process may be implemented as an apparatus, a method and a software product. The process 300 is preferably executed in the background or transparent to the users. In one embodiment, the process 300 is implemented in conjunction with an operating system such as Microsoft Windows.

At 302, the process 300 awaits an access request. When a requestor or user desires to access (e.g., open, print, execute or attach) a secured file, an access request is generated. The access request is intercepted at 304 to be determined by an access control management configured to enforce security of the file through an access control technique and a cryptographic technique. If the access control management determines that the user does not have the access privilege, such access request will be denied, otherwise, the process 300 goes to 306 to retrieve a key to be used at 308 to decrypt the requested file. At 310, the requested file is returned to the user in non-secured or clear form.

Figure 3B:
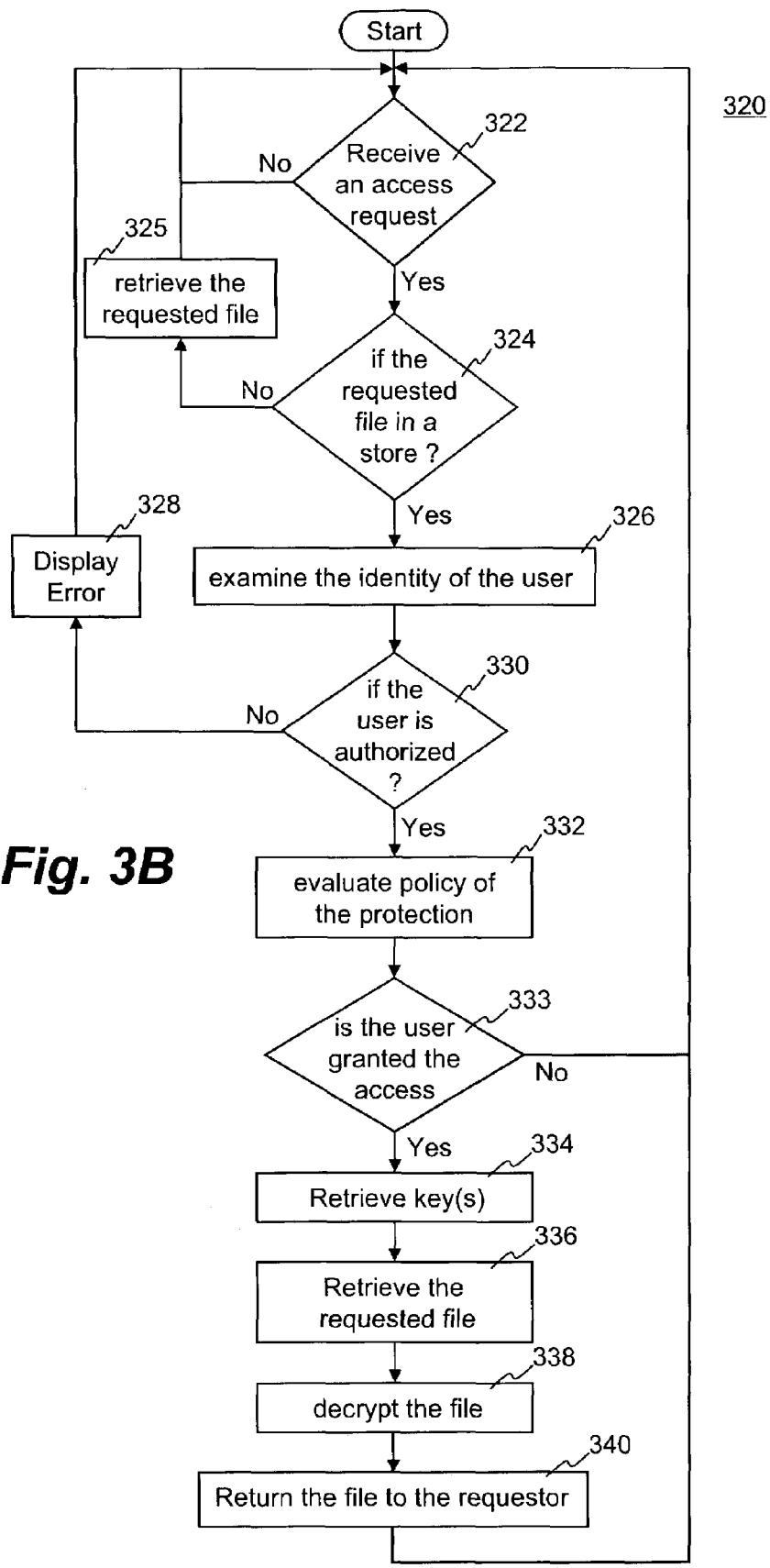
FIG. 3B shows a process flowchart that can be implemented as an apparatus, a method and a software product according to one embodiment of the present invention.

FIG. 3B shows another process flowchart 320 in accordance with one embodiment of the present invention and can be implemented as an apparatus, a method and a software product. Similar to the process 300, the process 320 is preferably executed in the background or transparently as far as the users are concerned. At 322, the process 320 awaits an access request. When an access request is received, the process 320 intercepts the request to examine if the file being requested is stored in a protected store or in a regular (unprotected) store. Typically, this can be done by examining the path that leads where the requested file resides. For example: a path: C:\Program Files\Microsoft Office\Office10\excel.exe indicates that a file named execl.exe is located in a non-protected folder while a path Z:\marketing\Potential Customers\list.doc may indicate that a file named list.doc is located in a protected store called "Potential Customers". As used herein, a protected store is a file place protected by an access control list and/or various access policies imposed thereupon and can only be accessed by authorized users permitted by the access policies as well as access policies. A regular or unprotected store is a file place that all users can access.

If it is determined that the file being requested is not in a protected store or a store that is a regular store, the access request is processed as usual at 325 (e.g., in an operating system, to return the requested file) and the process 320 returns to 322 to await another access request. When it is determined that the requested file is located in a protected store at 324, the process 320 continues to examine the identity of the user at 326. In accordance with the access control lit for the protected store, the process 320 determines whether the user is authorized to access such a file at 330. If the user is not permitted to access the store according to the access control list, the process goes to 322 to await another access request. Optionally, a denial message may be displayed at 328 to indicate to the user that his/her/its request has been denied.

As used herein, a user may mean a human user, a software agent, a group of users, a member of the group, a device and/or application. Besides a human user who needs to access a secured document, a software application or agent sometimes needs to access secured files in order to proceed forward. Accordingly, unless specifically stated, the "user" as used herein does not necessarily pertain to a human being.

With the permission to access the store, the process 320 continues to go to 332 to evaluated various access policies, if there are any, imposed upon the requested file or store. Depending on implementation, a system may choose to deploy system access policies, file access policies or other access policies on a file or store. Essentially, a policy, regardless how it is expressed, includes a number of rule items (e.g., pertaining to who, when, how or where a file can be access). The policy need to be evaluated against a requestor's access privilege and/or other system parameters at the time the access request is made. If the requestor's privilege (including corresponding parameters) can not be met by a policy (i.e., the rules), the corresponding access request is denied, otherwise, the access request is granted.

According to an example, an evaluation process of the access policy by the interpreter (which may be implemented in the access control module 202 of FIG. 1) may be carried out logically as follows:

((File is crypt)AND(memberofGroup"MKTG")AND (Time <5:00 PM))

where "AND" is a logic operator. It means that if a requestor attempts to access an encrypted file before 5:00 PM and also is a member of marketing group, the evaluation process carried out by the interpreter is considered successful. If the evaluation process fails, that means one of the parameters associated with the user or the access request can not be satisfied by the policy, the access to the file is then denied.

In any case, the policies are measured or evaluated respectively or collectively against the access privilege of the user at the time the access request is made. If the evaluation of the policies fails, namely the user is not permitted to access the file, the process 320 goes to 322 awaiting another access request. If the evaluation of the policies succeeds, the user is permitted to access the requested file, the process 320 goes to 334 to retrieve a key or key(s) to proceed with the access to the file. A key to be used to decrypt an encrypted file (i.e., one form of secured file) may be manually or automatically provided. In one embodiment, at 334, the user is prompted to provide a password that may be used as a decryption key or used as a key to decrypt a file containing a decryption key. In another embodiment, at 334, the decryption key is automatically provided, perhaps from a memory space. In any case, a description becomes available after the access control management has permitted the access quest from the user.

At 336 the file is retrieved and routed to an encryption/decryption engine or module for processing. At 338, the encrypted file (or an encrypted data portion thereof) is decrypted with the decryption key. The clear or unsecured version of the secured file is then returned to the user at 340.

Figure 4:
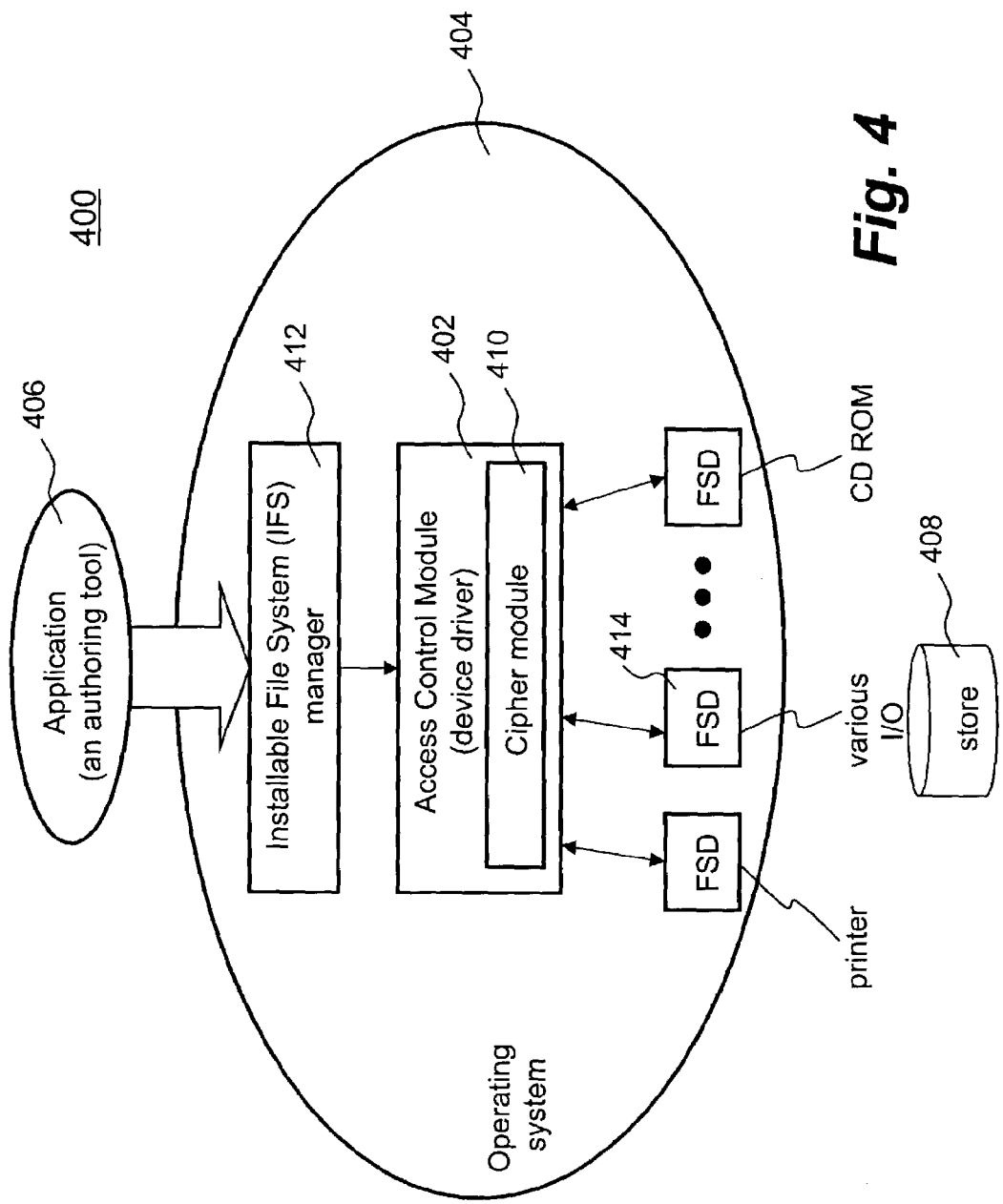
FIG. 4 shows an exemplary implementation of accessing files in a store in accordance with FIG. 3A or FIG. 3B.

FIG. 4 shows an exemplary implementation 400 of the present invention. An application 406, such as Microsoft Word and Windows Explorer, operates over an operating system (OS) 404 and may be activated to access an encrypted document stored in a store 408. The original document may be encrypted by any one of commonly used cipher schemes (e.g., Data Encryption Standard algorithm, Blowfish block cipher and Twofish cipher). To get a clear version of the document requires a key or keys to decrypt the encrypted version. In addition, a creator of the document may impose or request to impose certain access policies on the encrypted document such that that encrypted document can only be accessed when required conditions are satisfied with respect to the access policies. In other words, possession of a key to the encrypted document does not guarantee the access to an unencrypted version thereof.

According to one embodiment, the encrypted document is placed in the store 408 that may be located locally (e.g., hard disk) or remotely (e.g., another device). The store is protected by an access control (AC) module 402 implemented according to the present implementation. Depending on the security nature (secured vs. non-secured) of a document being accessed, the AC module 402 may activate a cipher module 410 to encrypt the document or decrypt the document if it is encrypted. According to one embodiment, the AC module 402 is analogous in many ways to a device driver that essentially converts more general input/output instructions of an operating system to messages that a device/module being supported can understand. Depending on the OS in which the present invention is implemented, the AC module 402 may be implemented as a VxD (virtual device driver), a kernel or other applicable format. The cipher module 410 is included in or controlled by the AC module 402.

In operation, a user navigates to select a document stored in the store 408. It is assumed that the document is associated with an application 406 (e.g., MS WORD, PowerPoint, Window Explore or printing). The application 406 acts on the document and an access request (e.g. an API call in Win32 API in MS Windows) is initiated. The access request is received in the installable file system (IFS) manager 412 in the operating system 404. The AC module 402 is configured to intercept the access request and determine if the user is authorized to proceed with the document in the store 408. After an evaluation process carried out by the AC module 402 with respect to the access privilege of the requestor and/or the system parameters (e.g., time, location and access protocol), the AC module 402 determines if the access requested shall be granted or denied.

It is now assumed that the user is authorized to access such file, the access request is granted and passed to an appropriate file system driver (FSD) 414 to access the requested document. As the document is retrieved from the store 408 to the application 406, the AC module 402 determines if it is secured by itself. The cipher module 410 is thus activated to facilitate the recovery (e.g., decryption) of the requested file with a key retrieved when the access request is granted. As a result, the file in clear mode is returned to the application 406 through the IFS manager 412. For example, if the application 406 is an authoring tool, the clear contents are displayed. If the application 406 is a printing tool, the clear contents are sent to a designated printer.

According to another embodiment, the AC module 402 resides in a memory space or in a file that is structured like a dynamic-link library (DLL), typically with a SYS or IFS extension, and is loaded during system initialization. Once the AC module 402 is installed and initialized, a kernel communicates with it in terms of logical requests for a file in the store 408 or elsewhere. The kernel passes the demands for sector I/O to an appropriate device driver and returns the results (e.g., the requested file) to the FSD 414.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein The advantages, features and benefits of the invention are numerous. Different embodiments or implementations may yield one or more of the following advantages. One advantage of the invention is that both techniques are combined under a single security management system allowing users to define elements of their security policies without regard to how each element will be enforced, through cryptography or through access control. Another advantage of the invention is, once a user has defined the conditions that must be met for a given data asset to be accessed, the system automatically enforces such conditions by using a combination of cryptographic and access control techniques. Still another advantage of the present invention is that the hybrid system is designed to enforce complex conditions other than user or group identity through the use of a software module that interprets the conditions and decided whether to grant or deny access to the protected data asset. Other advantages, features and benefits of the invention can be appreciated in the description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A method for accessing a file in a store, the method comprising:
   intercepting an access request from a user to access the file;
   determining if the file is an encrypted file;
   determining if the user is authorized to access the encrypted file in response to the determination that the file is encrypted;
   evaluating one or more access policies imposed upon the encrypted file or the store with respect to an access privilege of the user in response to the determination that the user is authorized to access the encrypted file;
   retrieving a key in response to the evaluation indicating that the one or more access policies is met;
   decrypting the encrypted file using the key; and
   passing the decrypted file to the user.

2. The method of claim 1, wherein the determining if the user is authorized to access the encrypted file comprises determining if the user is listed on an access control list (ACL).

3. The method of claim 1, wherein the intercepting the access request comprises determining if the file is unsecured.

4. The method of claim 1, wherein the evaluating the one or more access policies comprises evaluating a location of the user.

5. The method of claim 1, wherein the evaluating the one or more access policies comprises evaluating the one or more access policies with respect to a time the access request is made.

6. The method of claim 1, wherein
   each of the access policies includes rule items; and
   evaluating the one or more access policies comprises comparing each of the rule items logically with at least one of parameters pertaining to the access privilege of the user.

7. The method of claim 6, wherein said comparing of the rule items logically with at least one of the parameters comprises:
   producing a success if the comparing indicates a respective one of the parameters is within a definition of a corresponding of the rule items;
   producing a failure if the comparing indicates a respective one of the parameters is not within or is beyond the definition of the corresponding of the rule items; and
   repeating the comparing until each rule item has been tested against its respective parameters.

8. The method as recited in claim 7, wherein the comparing of the at least one of the parameters and the rule items is considered successful when each comparing produces a success result.

9. The method as recited in claim 7, wherein the comparing of the at least one of the parameters and the rule items is considered not successful when a failure results from any of the comparing.

10. The method of claim 1, wherein said retrieving a key comprises using a cryptographic technique and prompting to the user for a password.

11. The method of claim 10, wherein using the cryptographic technique comprises using the password to decrypt a file containing the key.

12. The method of claim 1, wherein the retrieving a key comprises automatically receiving the key associated with the user.

13. The method of claim 1, wherein an operation of the method is transparent to the user.

14. A tangible computer-readable medium having stored thereon, computer-executable instructions that, if executed by a computing device, cause the computing device to control access to a file in a store by a method, comprising:
   intercepting an access request from a user to access the file;
   determining if the file is an encrypted file;
   determining if the user is authorized to access the encrypted file in response to the determination that the file is encrypted;
   evaluating one or more access policies associated with the encrypted file or the store with respect to an access privilege of the user in response the determination that the user is authorized to access the encrypted file;
   retrieving a key in response to the evaluation indicating that the one or more access policies is met;
   decrypting the encrypted file using the key; and
   passing the decrypted file to the user.

15. The tangible computer-readable medium of claim 14, wherein determining if the user is authorized to access the encrypted file comprises determining if the user is listed on an access control list (ACL).

16. The tangible computer-readable medium of claim 14, wherein the intercepting the access request comprises determining if the file is unsecured.

17. The tangible computer-readable medium of claim 14, wherein the evaluating the one or more access policies comprises evaluating a location of the user.

18. The tangible computer-readable medium of claim 14, wherein the evaluating the one or more access policies comprises evaluating the one or more access policies with respect to a time the access request is made.

19. The tangible computer-readable medium of claim 14, wherein each of the access policies includes rule items; and evaluating the one or more access policies comprises comparing each of the rule items logically with at least one of parameters pertaining to the access privilege of the user.

20. The tangible computer-readable medium of claim 19, wherein said comparing of the rule items logically with respective parameters comprises:
   producing a success if the comparing indicates a respective one of the parameters is within a definition of a corresponding of the rule items;
   producing a failure if the comparing indicates a respective one of the parameters is not within or is beyond the definition of the corresponding of the rule items; and
   repeating the comparing until each rule item has been tested against its respective parameters.

21. The tangible computer-readable medium of claim 20, wherein the comparing of the respective parameters and the rule items is successful when each comparing is a success.

22. The tangible computer-readable medium of claim 20, wherein the comparing of the respective parameters and the rule items is not successful when a failure results from any of the comparing.

23. The tangible computer-readable medium of claim 14, wherein the retrieving a key comprises using a cryptographic technique and prompting the user to provide a password.

24. The tangible computer-readable medium of claim 23, wherein said using the cryptographic technique comprises decrypting a file containing the key using the password.

25. The tangible computer-readable medium of claim 14, wherein the retrieving a key comprises automatically receiving the key associated with the user.

26. A tangible computer-readable medium having instructions stored thereon, the instructions comprising: instructions to intercept an access request from a user to access a file in a store;
   instructions to determine if the file is an encrypted file;
   instructions to determine if the user is authorized to access the encrypted file in response to the determination that the file is encrypted;
   instructions to evaluate one or more access policies imposed upon the encrypted file or the store with respect to an access privilege of the user in response to a determination that the user is authorized to access the encrypted file;
   instructions to retrieve a key in response to the evaluation that indicates that the one or more access policies is met;
   instructions to decrypt the encrypted file using the key; and
   instructions to pass the decrypted file to the user.

27. A computer-implemented system comprising:
   a computer-readable storage medium configured to store a file; and
   an access control management module which if executed by a computing device of the computer-implemented system, causes the computing device to:
   intercept an access request from a user to access the file;
   determine if the file is an encrypted file;
   determine if the user is authorized to access the encrypted file in response to the determination that the file is encrypted;
   evaluate one or more access policies imposed upon the encrypted file or the store with respect to an access privilege of the user in response to a determination that the user is authorized to access the encrypted file;
   retrieve a key in response to an evaluation that indicates one or more access policies is met;
   decrypt the encrypted file using the key; and
   pass the decrypted file to the user.

28. A method for accessing a file in a store, the method comprising:
   intercepting a file access request from a user;
   determining if the store is a protected store;
   if the file is stored in the protected store, determining if the user is authorized to access the store;
   evaluating one or more access policies imposed upon the file or the store with respect to an access privilege of the user in response to a determination that the user is authorized to access the store;
   retrieving a key in response to the evaluating indicates that the one or more access policies is met;
   using the key to unsecure the file; and
   passing the unsecured file to the user.

29. The method of claim 28, wherein the determining if the file is stored in a protected store comprises examining a path where the requested file resides.

* * * * *